US012613161B2

(12) United States Patent
Mecl et al.

(10) Patent No.: US 12,613,161 B2
(45) Date of Patent: Apr. 28, 2026

(54) PHOTOLUMINESCENT TEMPERATURE MEASUREMENT SYSTEM

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA); James William Wiltshire Garrow, North Vancouver (CA); Michael William Goldstein, North Vancouver (CA)

(73) Assignee: ACCELOVANT TECHNOLOGIES CORP., North Vancouver (CA)

( * ) Notice: Subject to any disclaimer, the term of this patent is extended or adjusted under 35 U.S.C. 154(b) by 7 days.

(21) Appl. No.: 18/907,185

(22) Filed: Oct. 4, 2024

(65) Prior Publication Data

US 2026/0016370 A1      Jan. 15, 2026

Related U.S. Application Data

(60) Provisional application No. 63/588,863, filed on Oct. 9, 2023.

(51) Int. Cl.
| | |
|---|---|
| *G01M 11/00* | (2006.01) |
| *G01K 11/20* | (2006.01) |
| *G01K 11/32* | (2021.01) |
| *G01K 11/3213* | (2021.01) |
| *G05D 23/275* | (2006.01) |

(52) U.S. Cl.
CPC ............. *G01M 11/31* (2013.01); *G01K 11/32* (2013.01); *G01K 11/3213* (2013.01); *G01K 11/20* (2013.01); *G05D 23/27535* (2013.01)

(58) Field of Classification Search
CPC ... G01M 11/31; G01K 11/3213; G01K 11/32; G01K 11/20; G05D 23/27535
See application file for complete search history.

(56) References Cited

U.S. PATENT DOCUMENTS

| | | | | |
|---|---|---|---|---|
| 5,107,445 A * | 4/1992 | Jensen | ............... | G01K 11/3213 |
| | | | | 374/161 |
| 5,965,877 A * | 10/1999 | Wood | .................. | G01K 11/3213 |
| | | | | 356/73.1 |
| 8,193,726 B2 * | 6/2012 | Kinugasa | ........... | G01K 11/3213 |
| | | | | 315/307 |

(Continued)

*Primary Examiner* — Tarifur R Chowdhury
*Assistant Examiner* — Joshua M Carlson

(57) ABSTRACT

Examples of a system and method for temperature measurements and identifying a location of temperature measurement system failure are disclosed. The system comprises a light source and a detector mounted to a single substrate. When the system is in a temperature measuring mode, a driving circuit is providing a drive current pulse to the light source and the receiving circuit is receiving an emitted light from the sensor. If an amplitude of the emitted light is within a predetermined threshold, a failure in the sensor or an optical path is identified. When the system is in a monitoring mode, a continues drive current is provided to the light source so that the receiving circuit receives the return light and if the amplitude of the return light subtracted by the amplitude of the emitted light is within a predetermined threshold, a failure of the light source is identified.

19 Claims, 3 Drawing Sheets

(56)     References Cited

U.S. PATENT DOCUMENTS

| 8,751,188 | B2  | 6/2014  | Belak | |
| 10,996,117 | B1 * | 5/2021  | Mecl | G01J 5/0801 |
| 2009/0296770 | A1  | 12/2009 | Kinugasa | |
| 2018/0274907 | A1 * | 9/2018  | Sato | A61B 1/04 |
| 2022/0128415 | A1 * | 4/2022  | Mecl | G01K 11/32 |
| 2022/0136910 | A1 * | 5/2022  | Mecl | G01D 5/268 |
| | | | | 374/161 |

* cited by examiner

PHOTOLUMINESCENT TEMPERATURE MEASUREMENT SYSTEM

TECHNICAL FIELD

The present disclosure generally relates to a photoluminescent temperature measuring system and more particularly to a photoluminescent temperature measuring system for temperature measurement and monitoring of the system efficiency for identifying location of a failure.

BACKGROUND

Unless otherwise indicated herein, the materials described in this section are not prior art to the claims in this application and are not admitted to be prior art by inclusion in this section.

Known photoluminescent temperature measuring systems are fiber optic temperature measuring systems that use luminescence emitted from a sensing material (e.g., phosphor) to determine the temperature of an object that is in contact with the sensing material. Typically, thermographic phosphors when excited with light within a certain wavelength range, emit a light within a different wavelength range. Certain characteristics of the emitted light change with temperature including brightness, color, and afterglow duration. The response of the emitted light to temperature is monitored by various methods, such as analyzing the change in emission intensity at a single wavelength range or the change in intensity ratio of two or more wavelength ranges, lifetime decay, or shift in emission wavelength peak. Phosphor used for measuring the temperature of an object is either coated directly on its surface or placed within a probe and brought in contact with the surface, which is then illuminated with a light source and the temperature of the object is determined based on the response of the emitted light.

Standard fiber optic temperature measuring systems known in the prior art comprise a fiber optic probe with an active sensing material at its tip which is connectable to an opto-electronics that process the detected signals. Failure of the opto-electronics in fiber optic temperature sensors is often associated with major downtime and costs in manufacturing, especially in the semiconductor industry. Most common failure of the opto-electronic transducer is failure of an excitation light source (LED failure), failure at the sensor, or failure at the optical path (i.e., fiber optic probe damage). When the failure occurs, the manufacturing process have to be shut down to exchange the failed optoelectronic transducer.

In order to identify a location of the failure, separate monitoring system is used. For example, US20090296770 discloses a temperature measuring device that uses separate detectors for temperature measurement and monitoring to identify failure location making the system bigger, expensive, and more cumbersome.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

SUMMARY

Figure 1:
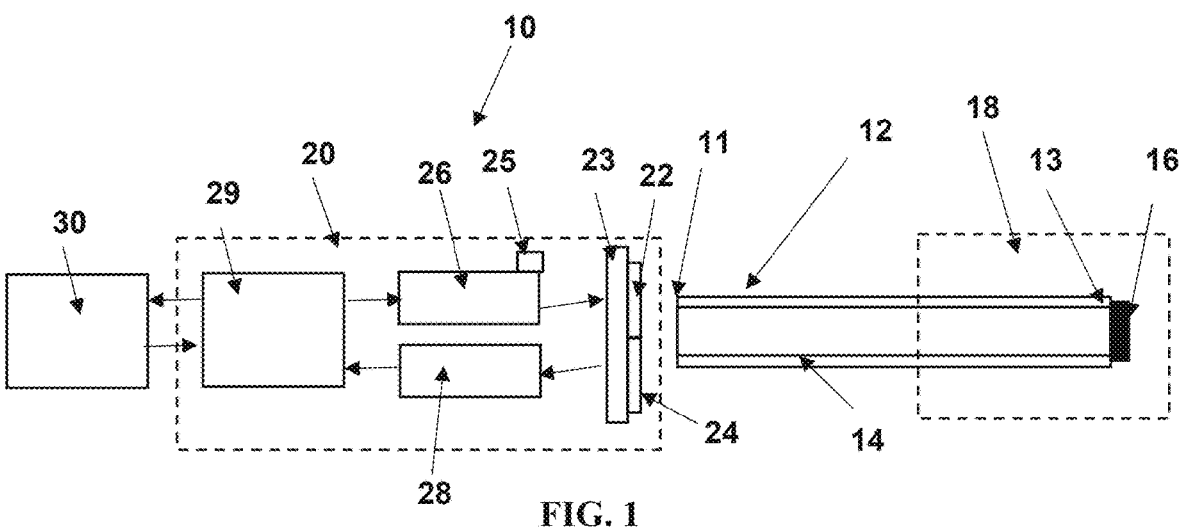
FIG. 1 is a schematic view of an example of a photoluminescent temperature measuring system of the present invention.

In one aspect, photoluminescent temperature measuring system for temperature measurement and monitoring for identifying system failure is provided. The photoluminescent temperature measuring system comprises a fiber optic probe with a fiber bundle to transmit an excitation light to an active material of a sensor and transmit a return light from the sensor. The system further comprises an optoelectronic module coupled to a first end of the fiber optic probe. The optoelectronic module comprises a light source mounted to a substrate to provide the excitation light to the sensor, a detector mounted to the substrate in close proximity to the light source to detect the return light from the sensor, a driving circuit with a switch to provide a drive current to the light source, a receiving circuit coupled to the detector and a processor coupled to the driving circuit and the receiving circuit. The driving circuit provides a drive current pulse to the light source when the system is in a temperature measurement mode and a continuous direct current to the light source when the system is in a monitoring mode. The receiving circuit, when the system is the temperature measurement mode, receives the emitted light emitted from the active material of the sensor after the light source is turned off and a light reflected back to the detector when the light source is driven by the continuous direct current during the monitoring mode. The processor is preprogramed to calculate an amplitude value of the light emitted from the active material of the sensor after the light source is turned off to determine a temperature in the environment based on a change in an emission intensity at a single wavelength range or the change in intensity ratio of two or more wavelength ranges, a lifetime decay, or a shift in emission wavelength peak of the emitted light during the temperature measurement mode, and to determine an efficiency of the light source by calculating an amplitude value of the light reflected back during the monitoring mode and subtracting the calculated amplitude of the emitted light, such that if the calculated emitted light amplitude value is within a predetermined emitted light amplitude threshold value range then an active material/fiber probe failure is identified, and if the calculated efficiency of the light source is within a predetermined light source efficiency threshold value range, a light source failure is identified.

In another aspect, a method for determining a temperature of an environment and identifying a location of temperature measurement system failure is provided. The method comprises providing a drive current pulse to a light source coupled to a substrate to provide an excitation light to a sensor with an active material, detecting an emitted light emitted from the sensor after the light source is turned off using a detector coupled to the substrate in close proximity to the light source and calculating an amplitude of the emitted light and determining a signal power amplitude of the emitted light, such that a failure in the sensor or the fiber optic probe is identified if the amplitude of the emitted light from the sensor is within a predetermined threshold value range. The method further comprising providing a continuous direct drive current to the light source and detecting the returned light while the light source is turned on, calculating an amplitude of the return light and determining an efficiency of the light source by subtracting the amplitude of the emitted light from the amplitude of the return light, such that a failure in the light source is identified if the efficiency of the light source is within a predetermined threshold value range. If no failures are identified, a temperature of an environment adjacent to the sensor is determined based on a change in an emission intensity at a single wavelength range or the change in intensity ratio of two or more wavelength ranges, a lifetime decay, or a shift in emission wavelength peak of the emitted light during the temperature measurement mode.

In addition to the aspects and embodiments described above, further aspects and embodiments will become apparent by reference to the drawings and study of the following detailed description.

DETAILED DESCRIPTION OF SPECIFIC EMBODIMENTS

Typically, the photoluminescent temperature measuring systems have temperature measurement system and a failure monitoring system that are separated one from another, may require separate detectors and optical paths and, in some implementations, may require collimating lenses, focusing lenses, mirrors or filters which increases the size and complexity/cost of the measuring device. The present invention discloses a temperature measurement system that allows for miniaturization and economical version of the sensing module by elimination optical lenses, filters or mirrors while also monitor the "health" of the system to identify any system degradation or system failure, location of such degradation/failure and therefore warn the user ahead of time if there is a need for a preventative maintenance.

FIG. 1 illustrates an example of a photoluminescent temperature measuring system 10 that comprises a fiber optic probe 12 with a fiber bundle 14 to transmit an excitation light to an active material of a sensor 16 and transmit a return light from the sensor 16. The fiber optic probe 12 has a first end 11 and a second end 13. The sensor 16 can be coupled to the second end 13 such that when a light is transmitted through the fiber bundle 14 it excites the active material in the sensor 16 in order to conduct temperature measurements in the environment/object 18 in proximity to the sensor 16. In one embodiment, the sensor 16 can be coupled to an object/environment where temperature measurements are conducted such that the second end 13 of the fiber optic probe 12 is brought in proximity to sensor during measurements.

An optoelectronic module 20 is connected to the first end 11 of the fiber probe 12. The optoelectronic module 20 comprises a light source 22 mounted to a substrate 23 to provide the excitation light to the sensor 16 and a detector 24 also mounted to the substrate 23 in close proximity to the light source 22 to detect the return light from the sensor 16. The light source 22 is aligned with the fiber bundle 14 so that the excitation light enters and is transmitted to the active material of the sensor 16. The detector 24 is also aligned with the fiber bundle 14 so that the light emitted from the active material of the sensor 16 is transmitted to the detector 24. The fiber bundle 14 can transmit both the excitation and the emitted light. The fiber bundle 14 can comprise a plurality of optical fibers arranged in parallel configuration in the fiber bundle 14, or it can be a single fiber bundle core. The fiber bundle core can be glass or polymer (plastic) optical fiber(s). A fiber bundle splitter can be provided, in one implementation, to split a single fiber bundle 14 into an excitation light guide and an emitted light guide thus allowing to use one portion of a fiber bundle 14 as a path to deliver excitation light to the sensor 16 and using the remaining portion of the fiber bundle 14 to guide the emitted light back to the detector 24. Integration of the fiber bundle splitter can replace the free space optical splitter used in the prior devices therefore allowing the opto-electronics to be sized much smaller. In addition, putting the light source 22 and the detector 24 on a single substrate 23 in close proximity one to another further minimizes the size of the system 10. In one embodiment, the fiber bundle 14 can comprise a separate excitation light guide align with the light source 22 and an emitted light guide align with the detector 24.

The light source 22 can be a laser or a LED that is configured to provide excitation light in the blue to green wavelength range (e.g. 350-550 nm). In one embodiment, the light source 22 can provide excitation light in the UV waveband between 200-400 nm. A driving circuit 26 with a switch 25 is coupled to the light source 22 to trigger the light source. The driving circuit 26 can have a first, temperature measuring mode, and a second, system monitoring mode. During the temperature measuring mode, the driving circuit 26 provides a drive current pulse to the light source 22 to provide excitation light to the sensor 16 to excites the active material. For example, the drive current pulse during the temperature measurement mode can be between 1ms to 100 ms. During the monitoring mode, the driving circuit 26 provides a continuous direct current to the light source 22 so that the light source 22 is turned on during the monitoring mode. The driving current can be in a range of 1 μA to 100 mA.

The detector 24 is configured to receive the light emitted from the sensor 16 during the temperature measuring mode once the light source (e.g., LED) is turned off and the returned (reflected) light detected during the monitoring mode when the light source 22 is still on illuminating the sensor 16. In one implementation, the detector 24 can be a photodiode. The photodiode 24 can convert the optical signal (emitted/reflected light) into an analog electrical signal. The photons absorbed by the photodetector 24 (e.g. photodiode) generate an electrical current. In one implementation, the electrical signal can be intensified using an amplifier (not shown) and then the analog electrical signal can be digitized using an A/D converter (not shown). In alternative embodiment, the detector 24 can comprise a plurality of LEDs to detect the emitted light. Namely, the plurality of LEDs is a semiconducting P-N junction (positive and negative doped semiconductor, such as silicon) that is capable to detect incident light by generating a photocurrent similarly as a photodiode.

A receiving circuit 28 is coupled to the detector 24. When the system is in the temperature measurement mode, the receiving circuit 28 receives the emitted light emitted from the active material of the sensor 16 after the light source 22 is turned off. During the monitoring mode, the receiving circuit 28 receives the light reflected back from the sensor 16 to the detector 24 while the light source 22 is still turned on.

The optoelectronic module 20 further comprises a processor 29 that is coupled to the driving circuit 26 and the receiving circuit 28. The processor 29 is preprogramed to calculate an amplitude value of the light emitted from the active material of the sensor 16 after the drive current pulse is completed and the light source 22 is turned off. Based on the amplitude value of the emitted light, the processor 29 determines if there is a failure in the sensor 16 (e.g., degradation of the active material) or failure/damage of the optical path in the fiber probe 12 (e.g., damage of the fiber bundle 14). If the emitted light amplitude is within a predetermined emitted light amplitude threshold value range, then failure is identified in the sensor 16 or the optical path (fiber probe 12) and a warning signal is sent to the user. The predetermined emitted light amplitude threshold value is settable in a range of 0 to 100 µW, so if the emitted light amplitude is within this range, then failure is identified. If the emitted light amplitude is bigger than the 100 µW threshold, then no failure in the sensor/optical path is identified. The processor 29 further determines an efficiency of the light source 22 by calculating an amplitude value of the light reflected back during the monitoring mode when the light source 22 is driven by the continuous drive current and by subtracting the calculated amplitude of the emitted light from the amplitude of the reflected light. If the calculated efficiency of the light source 22 is within a predetermined light source efficiency threshold value range, a light source 22 failure is identified and a warning signal to the user is sent. The predetermined light source efficiency threshold value is settable in a range of 0 to 1 mW, for example.

If no failure in the system 10 is identified, a temperature in the environment is determined by the processor 29 based on a change in an emission intensity at a single wavelength range or the change in intensity ratio of two or more wavelength ranges, a lifetime decay, or a shift in emission wavelength peak of the emitted light during the temperature measurement mode.

The processor 29 can further include a non-volatile memory with a configuration data and calibration data related to the fiber optic probe 12 and the active sensing material 16. The optoelectronic module 20 can further comprises a communication circuitry (not shown) that may be in communication with a power supply and any other additional external data processing unit.

The photoluminescent temperature measuring system 10 can further comprise a user interface 30 for informing the user about the measured temperatures and/or identified failure locations. The user interface 30 can be a digital user interface that communicate with processor 29, such as a human-machine interface (HMI) to connects a user interface or dashboard to the system 10, to visually display the measured temperature data and/or failure location, or track system degradation trends. The user interface 30 can further communicate with a proportional integral derivative (PID) controller, an industrial controller, a sensing network distributor, etc., or it can be part of the distributed sensing network around a semiconductor tool; or can be integrated in data aggregator for monitoring purposes. The user interface 30 can comprise a display for displaying the measured temperatures and/or the identified failure locations and can further comprise an audio element for providing audio massage of the measured temperatures and/or the identified failure locations.

Figure 2:
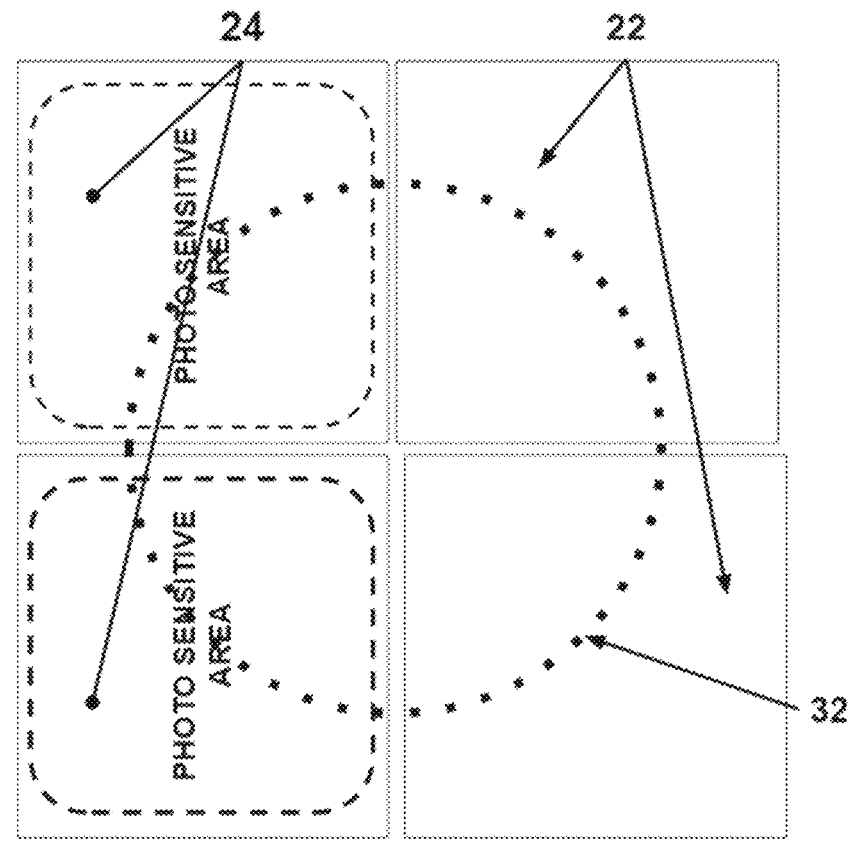
FIG. 2 is a schematic partial view of an example of a photoluminescent temperature measuring system showing a substrate with two light sources and two detectors.

In one embodiment, illustrated in FIG. 2, the light source 22 can be multiple light sources, such as multiple LEDs as a cluster. The light source 22 can, for example, comprise two or more light sources (LEDs) that can be redundant excitation sources in case the main LED fails. In the illustrated example in FIG. 2, there can be two LEDs 22 and two photodiodes 24. The close cluster arrangement of the multiple light sources 22 and/or detectors 24 allows for splitterless design of the system 10. The multiple light sources 22 (e.g., LEDs) allow the system 10 to provide excitation light at different wavelength to address different active materials for specific temperature ranges and photoluminescent materials. In one embodiment, using multiple light sources 22, can be used to have multiple redundant excitation sources, so that in case of light source 22 fails, the processor 29 of the system 10 can detect the light source failure and can deploy the backup light source. Before the deployment of the redundant light source, the light source efficiency is monitored, and the user is warned if degradation level reaches predetermined threshold value. In one embodiment, the light source 22 can be a flip chip LEDs with multiple LEDs in close proximity forming a tight cluster allowing for coupling into the fiber optic core port/path using the same optics as when singular LED is used. In another embodiment, the redundant active elements (LEDs) are free space optically coupled in the same optical path utilizing cold mirrors and lenses and focused in the same optical port, e.g., the same fiber core of 1 µA to 500 mA, for example. FIG. 2 illustrates the optical fiber core 32 of 1.5 mm diameter polymer optical fiber (POF) coupled to two LEDs 22 and two photodiode 24.

Figure 3:
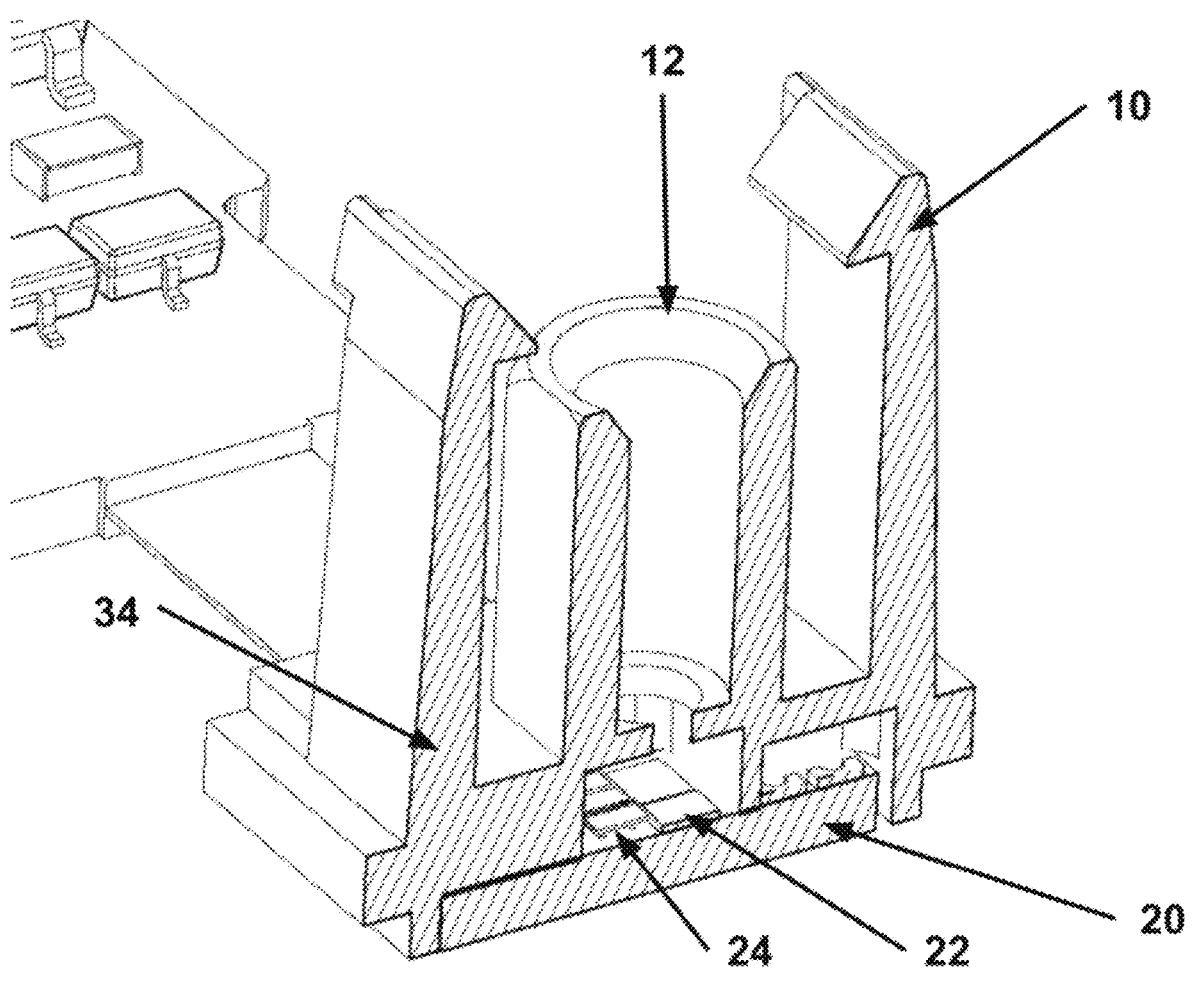
FIG. 3 is a schematic partial view of an example of a photoluminescent temperature measuring system showing a substrate with a light source and a detector connected to a fiber optic probe.

FIG. 3 shows partially the photoluminescent temperature measuring system 10 with the fiber optic probe. 10 coupled to the substrate 23 with the light source 22 and the detector 24. The system can comprise a single LED 22 and or two or more LEDs cluster and the detector 24 can comprise a single photodiode or a cluster of two or more photodiodes. A connector 34 is configured to connect the optoelectronic module 20 (aligning the light source 22 and the detector 24 with the fiber bundle 14) to the fiber optic probe 12.

Figure 4:
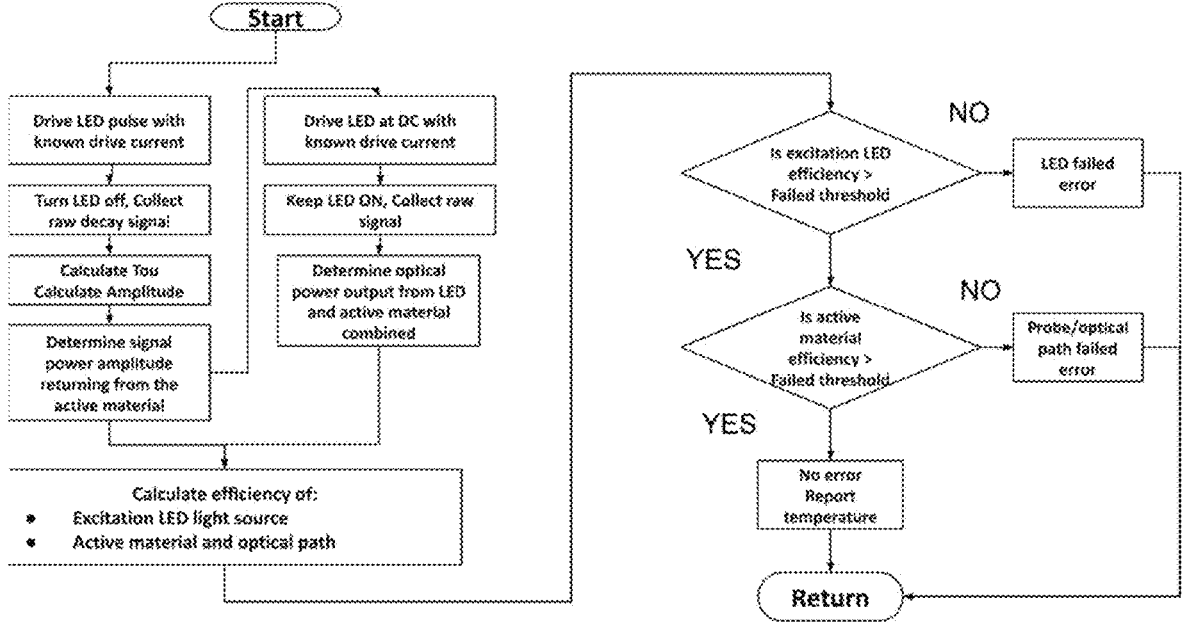
FIG. 4 is a flow chart of a method for temperature measurement and monitoring of the system efficiency for identifying location of a failure.

FIG. 4 illustrates a flow chart of a method for temperature measurement and monitoring of the system efficiency for identifying location of a failure. The method comprises switching on the driving circuit 26 to drive the light source 22 for a current pulse of 1 ms to 100 ms. The driving current can be in a range of 1 µA to 100 mA. Once the drive current pulse is over and the light source 22 is turned off, the detector 24 collects the raw decay signal (the emitted light) from the sensor 16 over period of 1 ms-100 ms (e.g., four integral windows over period of 1 ms-100 ms) and calculate (using processor 29) Tou (decay of the signal coming from the sensor 16) and amplitude of the emitted light A0 at time 0 after the light source 22 is turned off and determine the emitted light signal power amplitude returning from the active material of the sensor 16. Then the driving circuit 26 is switched on using the switch 25 to drive the light source 22 with driving current of 1 µA to 100 mA. Keeping the light source 22 on, the raw signal of the returned light (reflected light) is detected by the photodiode 24 and a power amplitude of the returned light is calculated by the processor 29. The calculated power amplitude of the returned light determines the optical power output of the light source 22 and the active material output combined, so by subtracting the emitted light amplitude calculated after the drive current pulse from the calculated amplitude when the light source is on the efficiency of the light source 22 is determined. If the efficiency of the light source 22 is settable in a range of 0 to 1 mW threshold value, for example, then a light source failure is identified and a warning signal to the user is sent using a user interface 30. If the efficiency of the light source 22 is higher than the 1 mW threshold value, for example, then no failure of the LED is identified. The efficiency of the sensor 16 and the optical path (e.g., efficiency of the fiber probe 12) are determined based on the emitted light signal power amplitude. For example, if the emitted light signal power amplitude is settable within the threshold value of a range of 0 to 100 µW, then failure is identified in the sensor 16 or the fiber probe 12. If the emitted light signal power amplitude is bigger than 100 µW, then no failure of the sensor 16 or fiber probe 12 is present and the temperature of the environment can be determined based on a change in an emission intensity at a single wavelength range or the change in intensity ratio of two or more wavelength ranges, a lifetime decay, or a shift in emission wavelength peak of the emitted light from the active material during the temperature measurement mode.

In one implementation, the active material can be a thermographic phosphor which when illuminated with an excitation light emits light in a wavelength different from the excitation light. For example, the excitation light can be UV light with a wavelength between 200-400 nm or light in the blue to green wavelength range (e.g. 350-550 nm). When the active material is illuminated with such excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A photoluminescent temperature measuring system comprising:

a fiber optic probe with a fiber bundle having a first end and a second end;

a sensor with an active material coupled to the second end of the fiber optic probe, wherein the fiber bundle is configured to transmit an excitation light to the active material of the sensor and transmit a return light from the sensor, the active material is illuminated with the excitation light so that it emits light in a wavelength different from the excitation light;

an optoelectronic module coupled to the first end of the fiber optic probe and comprising:

i. a light source mounted to a substrate to provide the excitation light to the sensor;

ii. a detector mounted to the substrate in proximity to the light source to detect the return light from the sensor;

iii. a driving circuit coupled to the light source and having a switch to provide a drive current to the light source, wherein the driving circuit provides:

1. A drive current pulse to the light source when the system is in a temperature measurement mode, and 2. A continuous direct current to the light source when the system is in a monitoring mode;

iv. a receiving circuit coupled to the detector to receive the emitted light emitted from the active material of the sensor after the light source is turned off and when the system is in the temperature measurement mode and a light reflected back to the detector when the light source is driven by the continuous direct current and when the system is in the monitoring mode; and v. a processor coupled to the driving circuit and the receiving circuit, the processor is preprogrammed to calculate an amplitude value of the light emitted from the active material of the sensor after the light source is turned off, and to determine an efficiency of the light source by calculating an amplitude value of the light reflected back during the monitoring mode and subtracting the calculated amplitude of the emitted light, wherein if the calculated emitted light amplitude value is within a predetermined emitted light amplitude threshold value range then an active material/fiber probe failure is identified, and wherein if the calculated efficiency of the light source is within a predetermined light source efficiency threshold value range a light source failure is identified, and wherein if no failures are identified the processor determines a temperature of an environment based on a change in an emission intensity at a single wavelength range or the change in intensity ratio of two or more wavelength ranges, a lifetime decay, or a shift in emission wavelength peak of the emitted light during the temperature measurement mode.

2. The photoluminescent temperature measuring system of claim 1, wherein the predetermined light source efficiency threshold value is settable in a range of 0 to 1 mW.

3. The photoluminescent temperature measuring system of claim 1, wherein the predetermined emitted light amplitude threshold value is settable in a range of 0 to 100 μW.

4. The photoluminescent temperature measuring system of claim 1, wherein the fiber bundle comprises a glass fiber or fibers, or polymer optical fiber or fibers.

5. The photoluminescent temperature measuring system of claim 1 further comprising a connector to connect the optoelectronic module to the fiber optic probe.

6. The photoluminescent temperature measuring system of claim 1, wherein a duration of the drive current pulse during the temperature measurement mode is between 1 ms to 100 ms.

7. The photoluminescent temperature measuring system of claim 1, wherein the light source is a laser diode.

8. The photoluminescent temperature measuring system of claim 1, wherein the light source is a light emitting diode (LED).

9. The photoluminescent temperature measuring system of claim 1, wherein the light source comprises two or more redundant light sources.

10. The photoluminescent temperature measuring system of claim 9, wherein the light source is a cluster of multiple LEDs.

11. The photoluminescent temperature measuring system of claim 10, wherein the processor switches over to any of the redundant light sources when failure of the light source is detected.

12. The photoluminescent temperature measuring system of claim 1, wherein the light source provides excitation light in a wavelength range of 350-550 nm.

13. The photoluminescent temperature measuring system of claim 10, wherein the detector is a cluster of multiple detectors.

14. The photoluminescent temperature measuring system of claim 1, wherein the fiber bundle includes a light guide operatively coupled to the light source and the detector to deliver the excitation light to the active material, and to transmit emitted and reflected light to the detector.

15. The photoluminescent temperature measuring system of claim 1, wherein the drive current is in a range of 1 μA to 100 mA.

16. The photoluminescent temperature measuring system of claim 1, further comprising a user interface, the user interface is a digital human-machine interface (HMI) that communicates with the processor to visually display measured temperature data and/or identified failure location, or track system degradation trends.

17. The photoluminescent temperature measuring system of claim 16, wherein the user interface comprises a display for displaying the measured temperature data and/or the identified failure locations.

18. The photoluminescent temperature measuring system of claim 17, wherein the user interface communicates with a proportional integral derivative (PID) controller, an industrial controller, a sensing network distributor, or is part of a distributed sensing network around a semiconductor tool, or is integrated in a data aggregator for monitoring purposes.

19. A method for determining a temperature of an environment and identifying a location of temperature measurement system failure, the method comprising:

a temperature measuring mode wherein:
  i. providing a drive current pulse to a light source coupled to a substrate to provide an excitation light to a sensor with an active material coupled to a second end of a fiber optic probe;
  ii. detecting an emitted light emitted from the sensor after the light source is turned off using a detector coupled to the substrate in proximity to the light source;
  iii. calculating an amplitude of the emitted light and determining a signal power amplitude of the emitted light, wherein a failure in the sensor or the fiber optic probe is identified if the amplitude of the emitted light from the sensor is within a predetermined threshold value range;

a monitoring mode wherein:
  i. providing a continuous direct drive current to the light source and detecting returned light during the continuous drive current provided to the light source;
  ii. calculating an amplitude of the return light and determining an efficiency of the light source by subtracting the amplitude of the emitted light from the return light, wherein a failure in the light source is identified if the efficiency of the light source is within a predetermined threshold value range; and
  iii. if no failure is identified, determining a temperature of an environment adjacent to the sensor based on a change in an emission intensity at a single wavelength range or change in intensity ratio of two or more wavelength ranges, a lifetime decay, or a shift in emission wavelength peak of the emitted light during the temperature measurement mode.

* * * * *